(12) United States Patent
Semper (10) Patent No.: US 7,558,241 B2
(45) Date of Patent: Jul. 7, 2009

(54) SYSTEM AND METHOD FOR FAST PACKET DATA CONNECTION SETUP

(75) Inventor: William Joseph Semper, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 588 days.

(21) Appl. No.: 11/485,771

(22) Filed: Jul. 13, 2006

(65) Prior Publication Data

US 2007/0297403 A1 Dec. 27, 2007

Related U.S. Application Data

(60) Provisional application No. 60/796,699, filed on May 2, 2006.

(51) Int. Cl.
*H04W 4/00* (2009.01)

(52) U.S. Cl. .................. 370/338; 370/328; 370/342; 370/345; 370/312; 455/435.1; 455/466

(58) Field of Classification Search ............... 370/338, 370/328, 342, 345, 312; 455/435.1, 466
See application file for complete search history.

(56) References Cited

U.S. PATENT DOCUMENTS

2006/0034202 A1 * 2/2006 Kuure et al. ................ 370/312

* cited by examiner

*Primary Examiner*—Nghi H Ly (57) ABSTRACT

The present disclosure relates generally to systems and methods for a setting up a packet data connection in a wireless network. In one example, a method may include receiving a packet data channel request and an invitation message at a first node over an air interface from a mobile device. The invitation message may be directed to a communication device. The invitation message may be inserted into a setup message used to set up the packet data channel and the setup message may be sent to a second node. The invitation message may be extracted from the setup message by the second node and forwarded to a third node. The setup message may be processed to establish the packet data channel.

25 Claims, 7 Drawing Sheets

| 0 | 1 | 2 | 3 | 4 | 5 | 6 | 7 | OCTET |
|---|---|---|---|---|---|---|---|---|
| ⇒A11 MESSAGE TYPE = [01H] | | | | | | | | 1 |

•
•
•

702

| ⇒ CRITICAL VENDOR/ORGANIZATION SPECIFIC EXTENSION: TYPE = [26H] | 1 |
|---|---|
| RESERVED = [0000 0000] | 2 |
| (MSB) ┊ LENGTH=<variable> | 3 |
| ┊ (LSB) | 4 |
| (MSB) ┊ 3GPP2 VENDOR ID = 00 00 15 9FH | 5 |
|  | 6 |
|  | 7 |
| ┊ (LSB) | 8 |
| APPLICATION TYPE = [01H, 02H] | 9 |

•
•
•

704

| {APPLICATION TYPE = 09H; ELSE IF (APPLICATION TYPE = 10H (SIP MESSAGE))}1 | |
|---|---|
| APPLICATION SUB TYPE = [01H (SIP INVITE)] | 10 |
| LENGTH=<var> | 11 |
| (MSB) ┊ SIP INVITE MESSAGE = <any value> | 12 |
| ... | ... |
| ... ┊ (LSB) | n |

SYSTEM AND METHOD FOR FAST PACKET DATA CONNECTION SETUP

CROSS REFERENCE

This application claims priority from U.S. Provisional Patent Ser. No. 60/796,699, entitled "FAST VOIP CALL SETUP", filed on May 2, 2006, which is hereby incorporated by reference in its entirety.

BACKGROUND

Communications networks, such as those that can support wireless voice and/or data, generally support the establishment of a packet data connection (e.g., Voice over Internet Protocol) from a mobile device to another communication device. In order to provide such support, a series of messages are passed between the mobile device and the network and between various network components. Such messages may include messages used to initially establish the packet data connection and later messages used to maintain the connection once established. Although the content and format of the messages may depend on the particular type of network, many networks operate using a similar approach of call setup and maintenance.

The messaging used to establish and maintain a packet data connection frequently includes inefficiencies. Accordingly, improvements are needed in such messaging.

SUMMARY

In one embodiment, a method for setting up a packet data session in a wireless network is provided. The method includes receiving a packet data channel request message and an invitation message at a first node over an air interface from a mobile device, wherein the invitation message is directed to a terminating device. The invitation message is inserted into a setup message used to set up the packet data channel and the setup message is sent to a second node. The invitation message is extracted from the setup message by the second node and forwarded to a third node. The setup message is processed to establish the packet data channel.

In another embodiment, a method for setting up a packet data session in a wireless network is provided. The method includes receiving a packet data channel request and an invitation message for a terminating device over a wireless air interface from a mobile device. The invitation message is inserted into a setup request message and the setup request message is sent to a packet control function node. The invitation message is extracted from the setup request message and inserted into a registration request message. The registration request message is sent to a packet data serving node and extracted from the registration request message. The invitation message is forwarded to the terminating device, wherein the invitation message is forwarded while the packet data channel is being established with the mobile device.

In yet another embodiment, a system is provided. The system includes an access network and a core network coupled to the access network, wherein the core network includes at least one packet switching node. The system also includes a plurality of executable instructions including instructions for receiving a packet data channel request message and an invitation message by the access network over an air interface from an originating access terminal, wherein the invitation message is directed to a terminating access terminal. The instructions also include instructions for inserting the invitation message into a setup message used to set up the packet data channel and sending the setup message to the core network. The instructions also include instructions for extracting the invitation message from the setup message by the packet switching node, and forwarding the invitation message to establish a connection with the terminating access terminal. The instructions also include instructions for processing the setup message to establish the packet data channel.

In still another embodiment, a node in a communications network is provided. The node includes a first interface configured for receiving an inbound message for establishing a packet data session, a second interface configured for sending an outbound message for establishing the packet data session in response to receiving the inbound message, and a plurality of executable instructions. The instructions include instructions for extracting an invitation message from the inbound message, wherein the invitation message is not needed for establishing the packet data session. The instructions also include instructions for inserting the extracted invitation message into the outbound message for communication to another node in the communications network.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
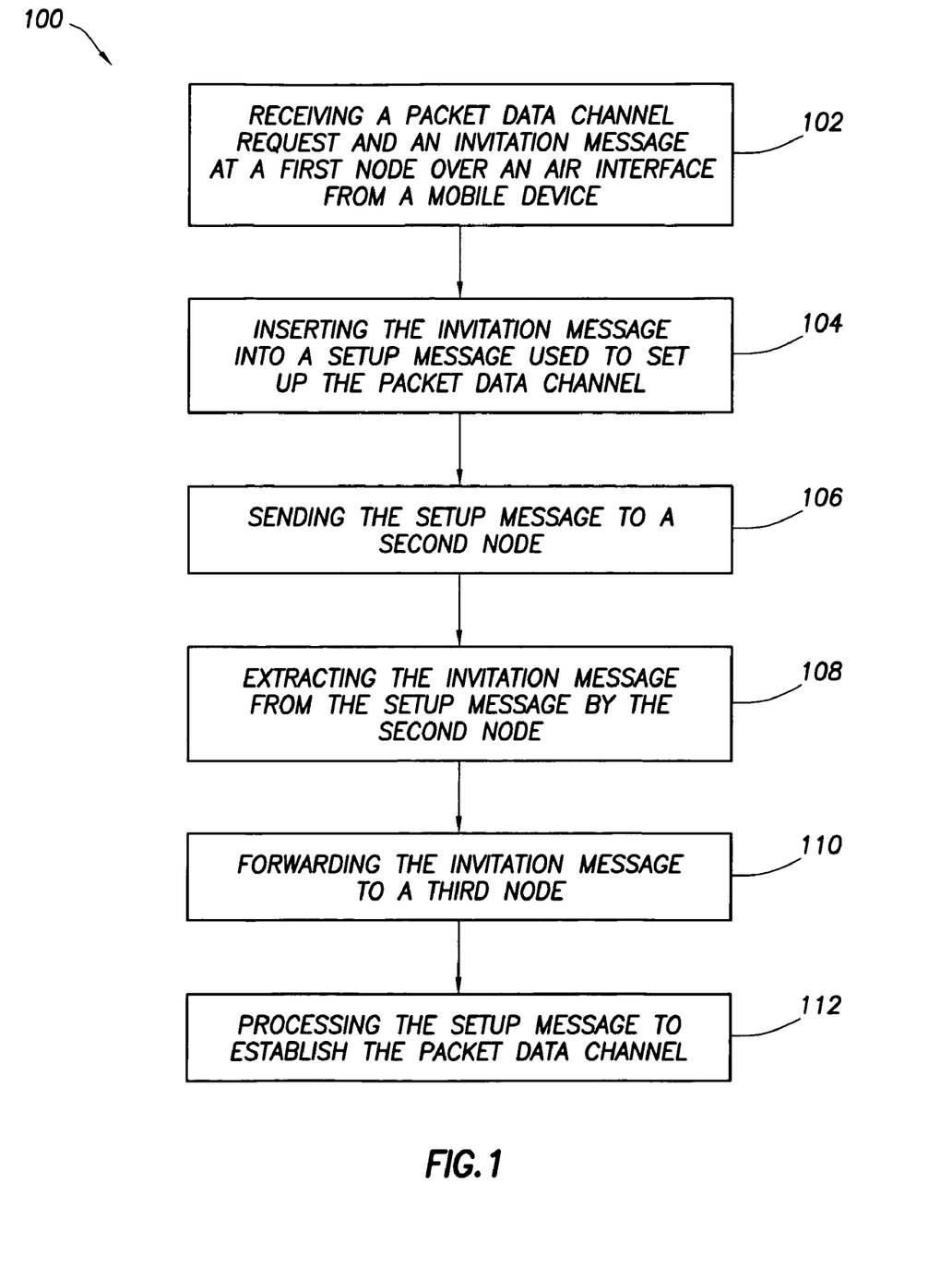
FIG. 1 is a flowchart illustrating one embodiment of a method for performing a fast packet data connection setup in a wireless network.

Referring to FIG. 1, in one embodiment, a method 100 may be used to set up a packet data session in a wireless network. In the present example, an access terminal (AT) (e.g., a mobile device) is requesting a connection to another AT. For example, the mobile device may be requesting the packet data session in order to initiate a VoIP session with another mobile device.

In step 102, a packet data channel request and an invitation message are received from the mobile device at a first node over an air interface. The invitation message may be directed to the other AT, which may be a mobile or fixed device. The packet data channel request and the invitation message may be received together or as separate messages. For example, the invitation message may be inserted by the mobile device into the packet data channel request or the mobile device may send the two messages separately (e.g., the packet data channel request followed relatively quickly by the invitation message).

In step 104, the invitation message may be inserted into a setup message used to set up the packet data channel. The insertion may occur at the first node or elsewhere. The setup message may then be sent to a second node in step 106, which may extract the invitation message from the setup message in step 108. In step 110, the invitation message may be forwarded to a third node. The forwarding may include inserting the invitation message into another setup message or may involve forwarding the invitation message by itself. It is understood that the term "forwarding" is used to indicate that portions of the invitation message needed for use in making the invitation are transferred to the third node, and that the invitation message itself may not be forwarded in the same form in which it was received.

In step 112, the setup message may be processed to establish the packet data channel. The processing may occur at one or more nodes. For example, the second node may receive the setup message and process it to perform certain functions, and request that other nodes perform additional processing. Accordingly, by inserting the invitation message into the setup message, the invitation process may be started before the packet data channel with the mobile device is established.

Figure 2:
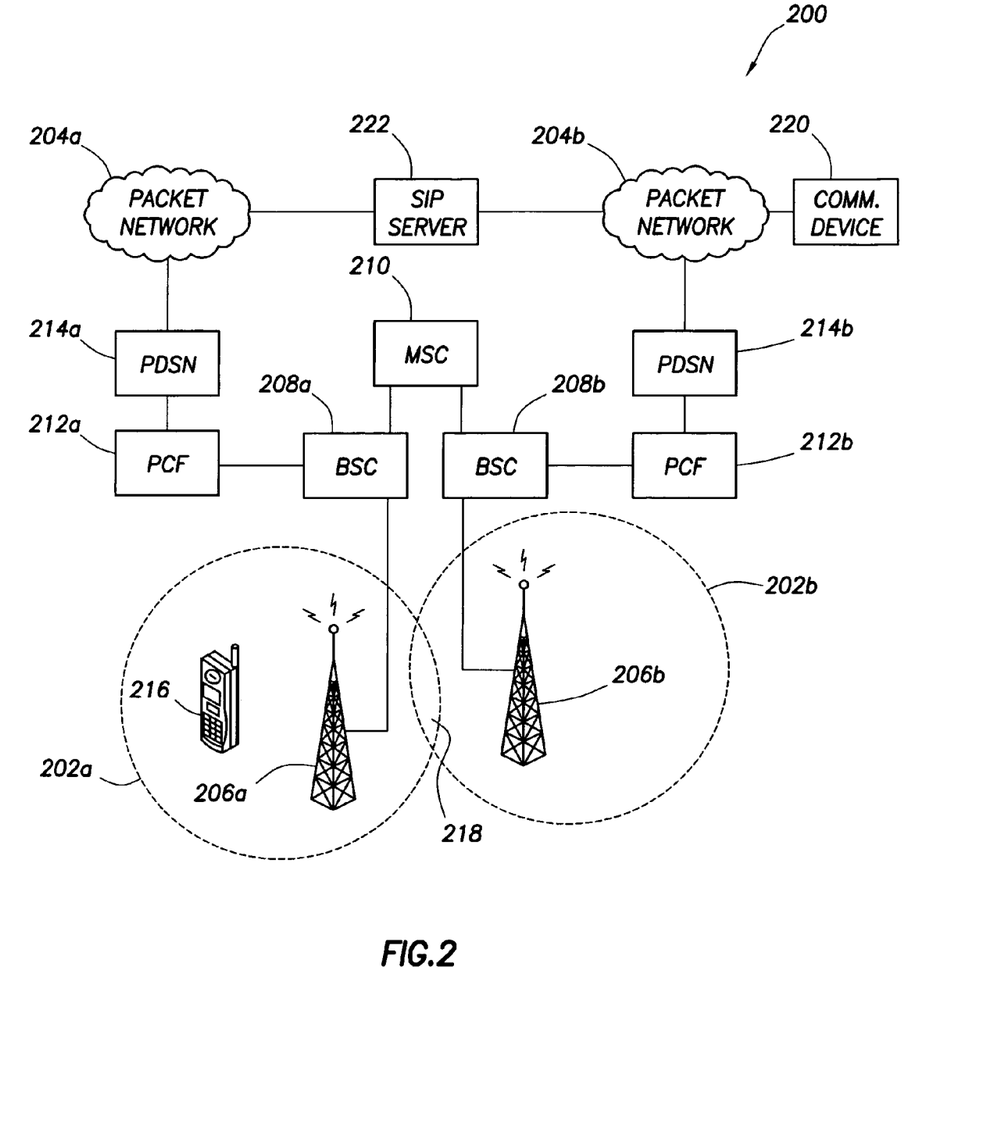
FIG. 2 is a diagram of one embodiment of a system within which the method of FIG. 1 may be implemented.

Referring to FIG. 2, a communications network 200 illustrates one embodiment of a system within which the method 100 of FIG. 1 may be used. In the present example, the network 200 is an evolution data-only (EV-DO) architecture based on Code Division Multiple Access (CDMA) technology that may be compatible with a variety of standards including, but not limited to, Interim Standard 95 (IS-95), Interim Standard 2000 (IS-2000) and Universal Mobile Telecommunications System (UMTS). The network 200 may represent other technologies, including Global System for Mobile communication (GSM), and Orthogonal Frequency Division Multiplexing (OFDM). Accordingly, it is understood that the methods of the present disclosure may be performed in networks based on different technologies, such as High Rate Packet Data-based Radio Access Networks (HRPD-based RANs) and that the examples using a CDMA network are for purposes of illustration only.

The network 200 comprises a plurality of cells 202a, 202b. In the present example, the network 200 is a wireless network, and may be connected to other wireless and/or wireline networks, such as packet networks 204a, 204b. Each cell 202a, 202b in the network 200 includes a base station (BS) 206a, 206b, respectively, that are coupled to base station controllers (BSC) 208a, 208b, respectively. A mobile switching center (MSC) 210 may be used to connect the network 200 with other networks such as a Public Switched Telephone Network (PSTN) (not shown). Although not shown, the base stations 206a and 206b may be coupled to the same BSC, and the BSCs 208a and 208b may be coupled to separate MSCs. The base station 206a and BSC 208a may form an access network (AN) and the base station 206b and BSC 208b may form another AN, or the base stations 206a, 206b and BSCs 208a, 208b may form a single AN. The AN is coupled to a core network (CN) formed at least in part by the MSC 210.

The BSCs 208a, 208b may also be coupled to other CN components, including packet-switched nodes. In the present example, the BSC 208a is coupled to a packet control function (PCF) node 212a, which is coupled to the packet network 204a via a packet data serving node (PDSN) 214a. The BSC 208b is coupled to a PCF node 212b, which is coupled to the packet network 204b via a PDSN 214b. The terms "packet" and "packet data", as used in the present disclosure, may be interchangeable and may include any type of encapsulated data, including datagrams, frames, packets, and the like, and the encapsulated information may include voice, video, data, and/or other encapsulated information. The packet networks 204a, 204b may be the same network or separate networks, and may be any combination of private and public networks based on any packet technology, such as the Internet Protocol (IP) and the Transport Control Protocol (TCP).

The network 200 enables an AT 216 to communicate with another communication device 220 (e.g., a terminating device) via the BS 206a associated with the cell 202a in which the AT is located. Although illustrated in FIG. 2 as a cellular phone, it is understood that the AT 216 may be any portable device capable of wirelessly participating in a packet session, and such devices may include personal digital assistants, portable computers, pagers, and/or cellular phones. The cells 202a, 202b overlap so that the AT 216 may travel from one cell to another (e.g., from the cell 202a to the cell 202b) while maintaining a communication session. In a handoff region 218 (e.g., the area where the cells 202a, 202b overlap), the AT 216 may be serviced by both the BS 206a and the BS 206b.

The device 220 with which the AT 216 communicates may be fixed or wireless. Furthermore, although shown as coupled to packet network 204b, it is understood that the device 220 may be coupled to any network that is accessible to the packet network 204a. For purposes of illustration, a Session Initiation Protocol (SIP) server 222 may be coupled to one or both of the packet networks 204a, 204b, either directly or via another network (not shown). It is understood that other components may replace the SIP server 222 in some embodiments.

Figure 3:
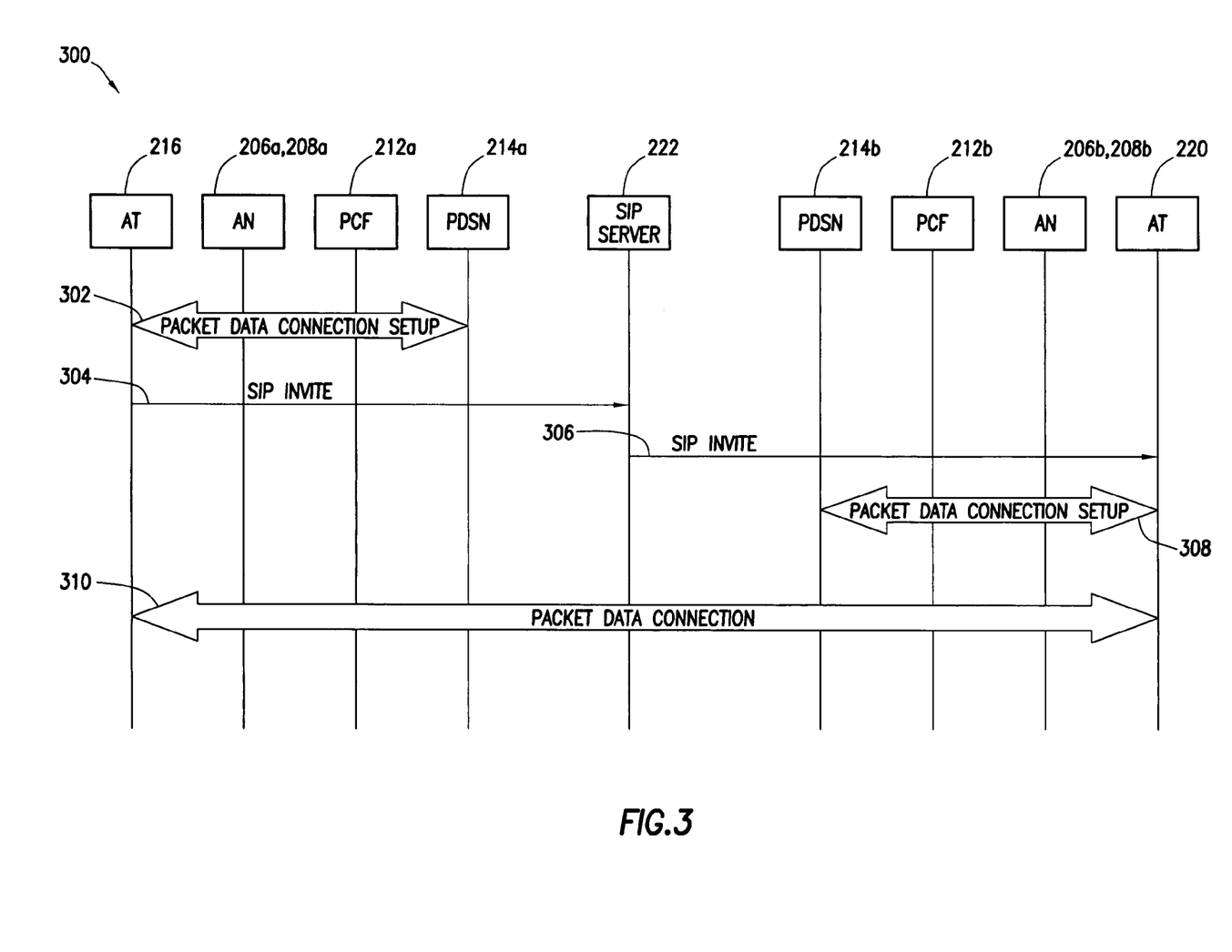
FIG. 3 is a diagram illustrating a message sequence that may be used for establishing a packet data connection within the system of FIG. 2.

Referring to FIG. 3, a sequence diagram 300 illustrates a conventional call setup process. For purposes of example, referring to FIG. 2, the originating AT is the AT 216, the originating AN includes the base station 206a and BSC 208a, the originating PCF is the PCF 212a, the originating PDSN is the PDSN 214a, the terminating PDSN is the PDSN 214b, the terminating PCF is the PCF 212b, the terminating AN includes the base station 206b and BSC 208b, and the terminating AT is the AT 220. For purposes of illustration, the SIP server 222 is used, but it is understood that other components may replace the SIP server in some embodiments.

In step 302, the originating AT 216 may establish a packet data session with the AN 206a. The session establishment may include various messages passed between the AT 216, AN 206a, PCF 212a, and PDSN 214a. As such session establishment messages are commonly known to those of skill in the art, they will not be discussed herein in further detail. In step 304, after the session has been established, the AT 216 may initiate a connection (e.g., a VoIP call) with the terminating AT 220 by sending a message, such as a SIP INVITE message, to a server (e.g., the SIP server 222).

In step 306, based on information in the SIP INVITE message, the SIP server 222 may initiate a connection with the terminating AT 220. The terminating AT 220 may then establish a packet data session with the AN 206b in step 308. The session establishment may include various messages passed between the AT 220, AN 206b, PCF 212b, and PDSN 214b. After this connection has been established, the originating AT 216 and the terminating AT 220 may communicate with each other using SIP messages and establish the VoIP call in step 310. As such SIP messages and VoIP calls are commonly known to those of skill in the art, they will not be discussed herein in further detail. As can be seen in the sequence diagram 300, the originating AT 216 and the terminating AT 220 may not begin the SIP signaling needed to establish the VoIP call until both sides have established connections to their respective packet data network.

Figure 4:
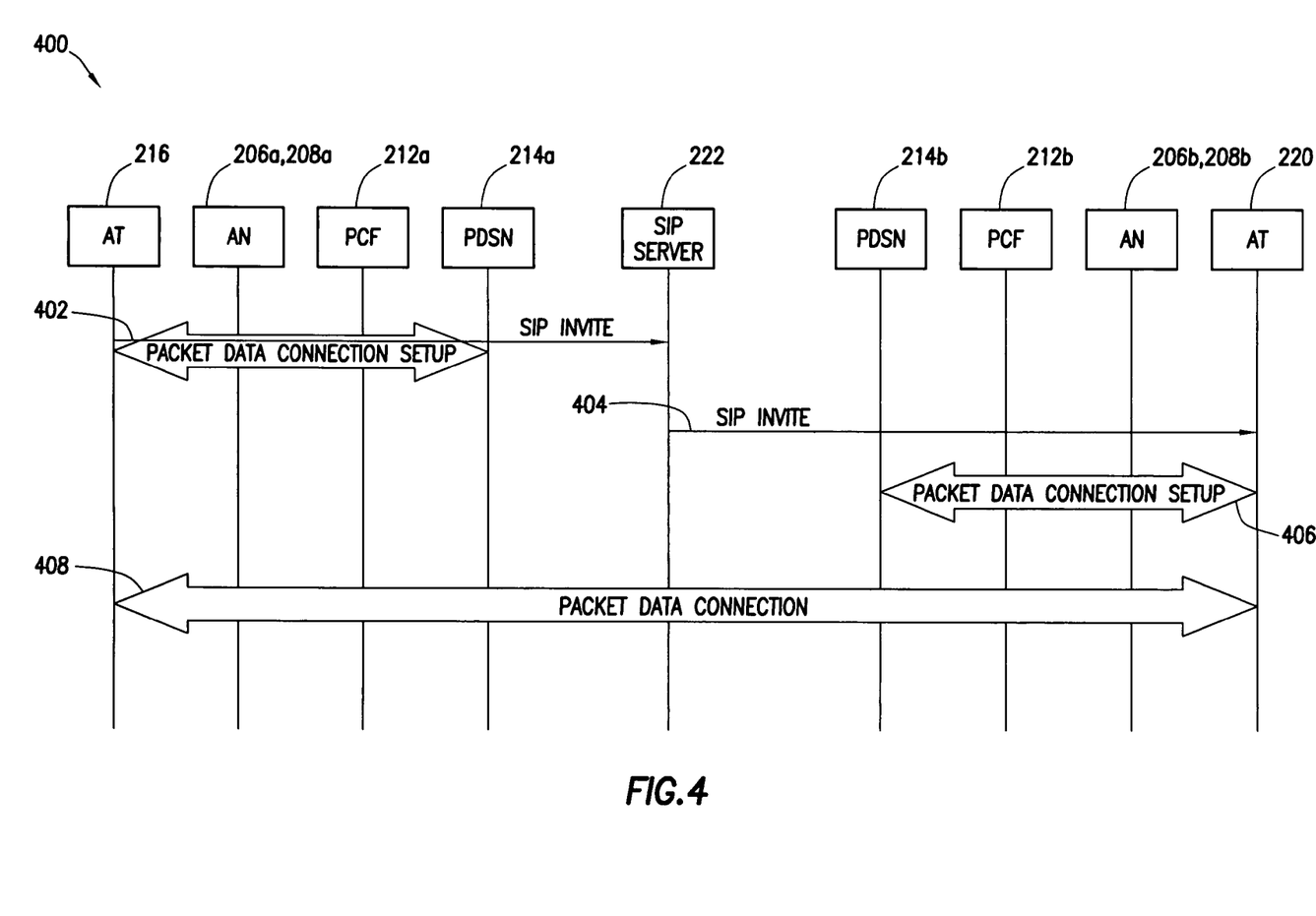
FIG. 4 is a diagram illustrating one embodiment of a message sequence that may be used for establishing a fast packet data connection within the system of FIG. 2.

Referring to FIG. 4, a sequence diagram 400 illustrates one embodiment of a fast call setup process. For purposes of example, referring to FIG. 2, the originating AT is the AT 216, the originating AN includes the base station 206a and BSC 208a, the originating PCF is the PCF 212a, the originating PDSN is the PDSN 214a, the terminating PDSN is the PDSN 214b, the terminating PCF is the PCF 212b, the terminating AN includes the base station 206b and BSC 208b, and the terminating AT is the AT 220. The SIP server 222 is also used for purposes of illustration.

In step 402, the originating AT 216 may establish a packet data session with the AN 206a. The session establishment may include various messages passed between the AT 216, AN 206a, PCF 212a, and PDSN 214a. As such session establishment messages are commonly known to those of skill in the art, they will not be discussed herein in further detail. However, rather than waiting until the session has been established before sending a message such as a SIP INVITE, the SIP INVITE may be sent during the session establishment. For example, the SIP INVITE may be sent with the message requesting the session establishment (e.g., inserted within the message or sent in a separate message). Accordingly, the SIP server 222 may receive the SIP INVITE intended for the terminating AT 220 before the session establishment represented by step 402 is complete.

In step 404, based on information in the SIP INVITE message, the SIP server 222 may initiate a connection with the terminating AT 220. This may occur before the session establishment represented by step 402 is complete. The terminating AT 220 may then establish a packet data session with the AN 206b in step 406. The session establishment may include various messages passed between the AT 220, AN 206b, PCF 212b, and PDSN 214b. Again, at least a portion of this process may occur before the session establishment represented by step 402 is complete. After this connection has been established, the originating AT 216 and the terminating AT 220 may communicate with each other using SIP messages and establish the VoIP call in step 408. As such SIP messages and VoIP calls are commonly known to those of skill in the art, they will not be discussed herein in further detail. As can be seen in the sequence diagram 400, the originating AT 216 and the terminating AT 220 may begin the SIP signaling needed to establish the VoIP call prior to both sides having established connections to their respective packet data network.

Figure 5:
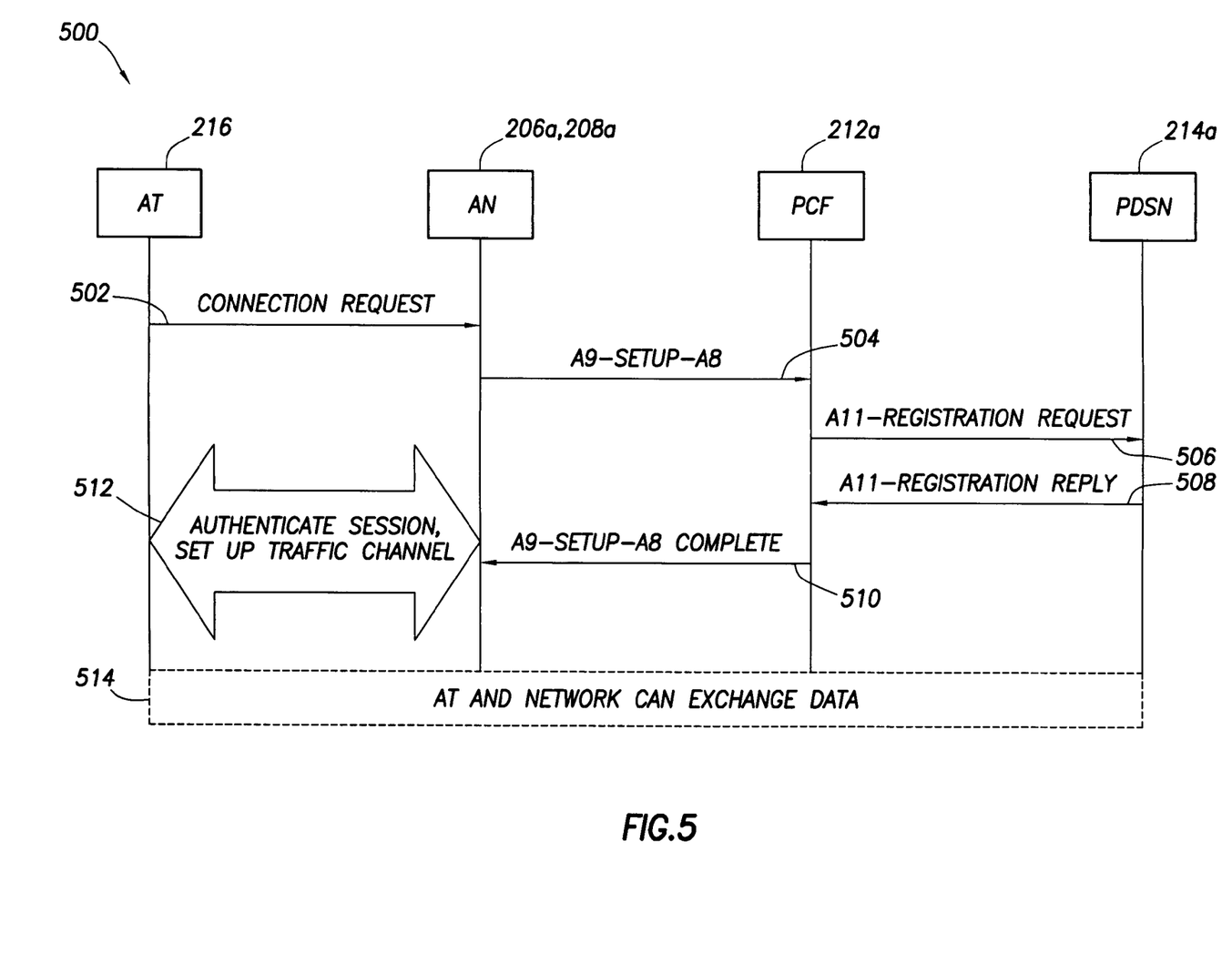
FIG. 5 is a diagram illustrating one embodiment of a portion of the message sequence of FIG. 4 in greater detail.

Referring to FIG. 5, a sequence diagram 500 illustrates a more detailed embodiment of a portion of the call setup process of FIG. 4. In step 502, the AT 216 sends a connection request to the AN 206a. In the present example, the AT 216 inserts a SIP INVITE message into the connection request. The SIP INVITE message may or may not be identical to one that would be sent later in a conventional sequence (e.g., in step 304 of FIG. 3).

Figure 6:
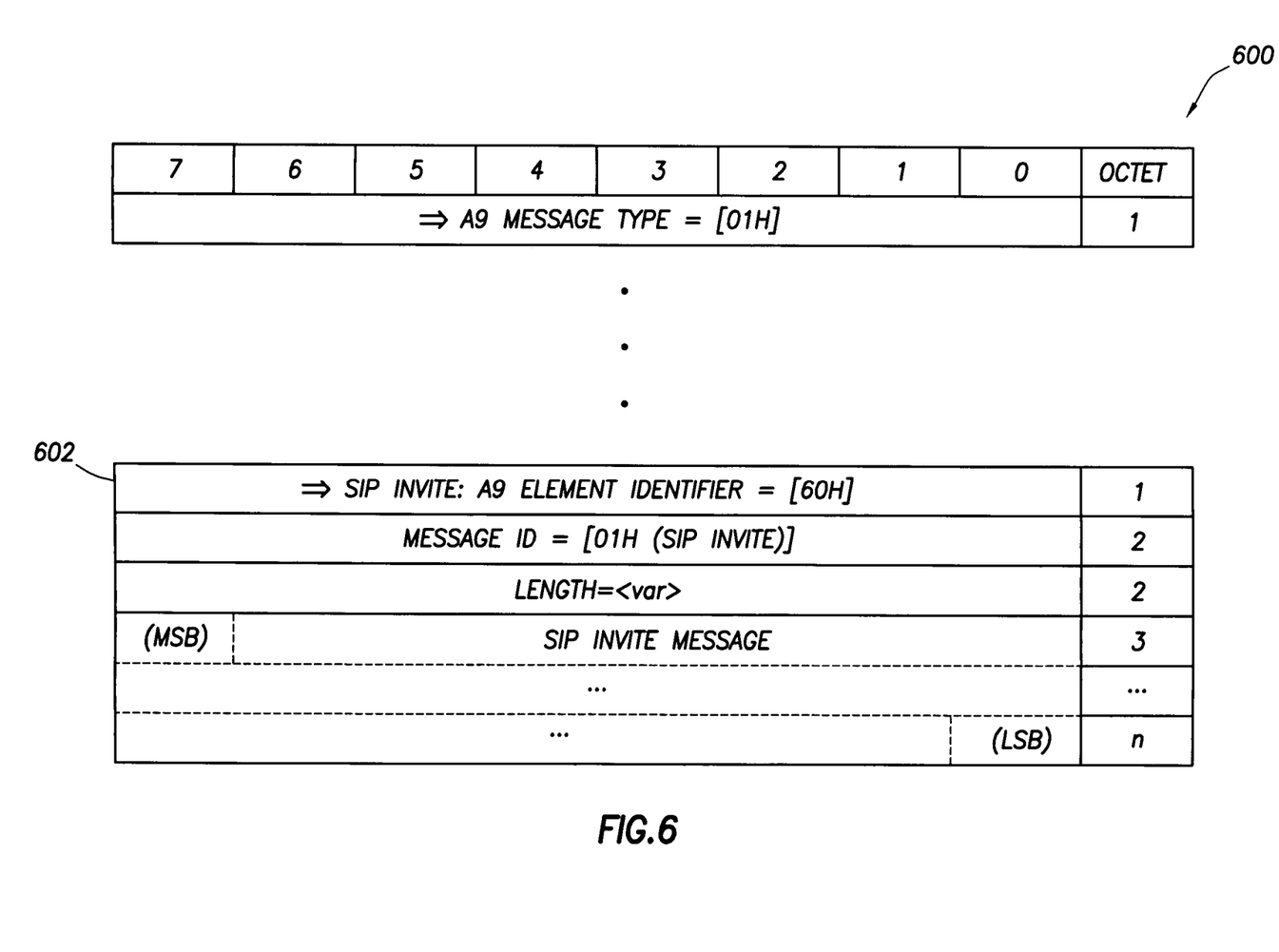
FIG. 6 is a portion of a message that may be used with the message sequence of FIG. 4.

With additional reference to FIG. 6, upon receiving a connection request from the AT 216, the AN 206a may generally send a message such as an A9-Setup-A8 message to the PCF 212a. In the present embodiment, because the connection request contains the SIP INVITE message, the AN 206a may extract the SIP INVITE message and insert it into the A9-Setup-A8 message. For example, the SIP INVITE message may be inserted into a section 602 with a header of "SIP INVITE: A9 Element Identifier=[60H]". It is understood that the header, contents, and location of the SIP INVITE message within the A9-Setup-A8 message may differ from that shown. The insertion may occur using a standard mechanism provided for inserting fields into such a message. After inserting the SIP INVITE message into the A9-Setup-A8 message, the AN 206a may then send the message to the PCF 212a in step 504.

Figure 7:
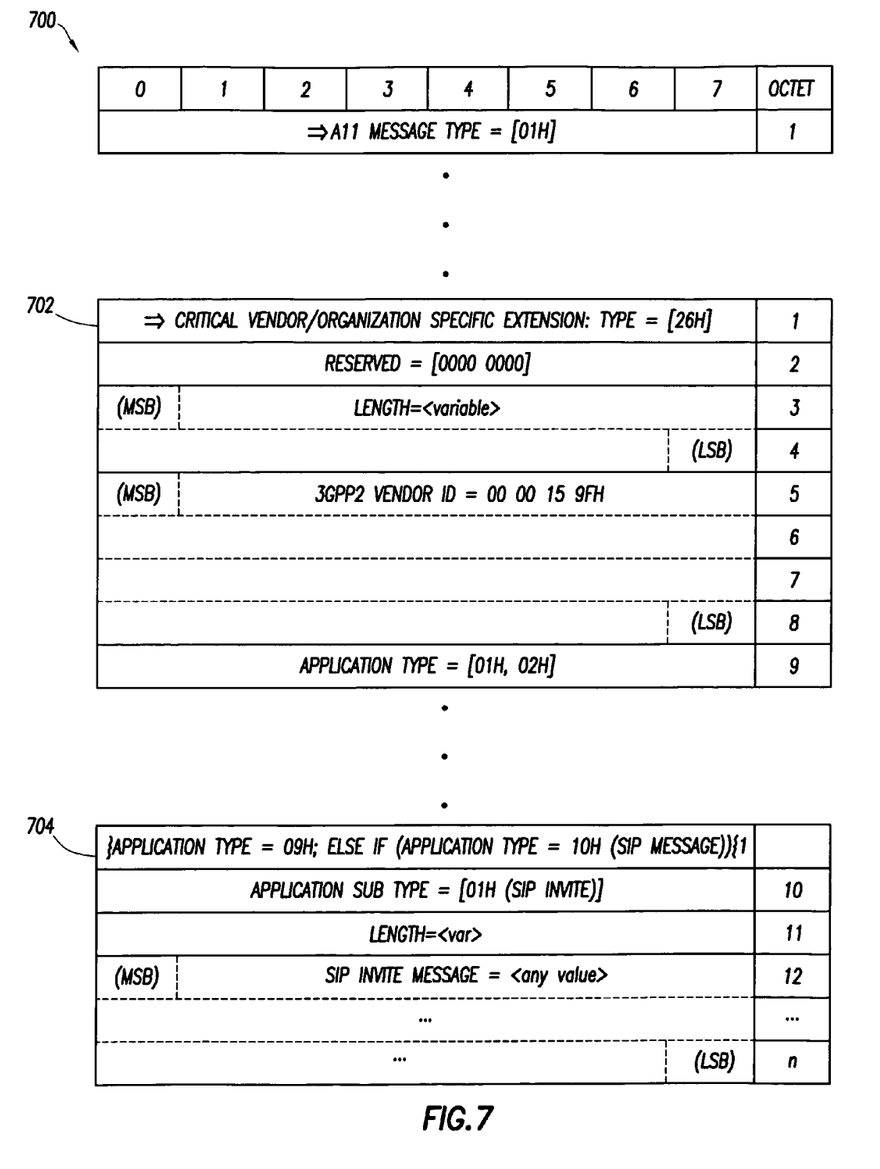
FIG. 7 is a portion of a message that may be used with the message sequence of FIG. 4.

With additional reference to FIG. 7, upon receiving an A9-Setup-A8 message from the AN 206a, the PCF 212a may generally send a message such as an A11 Registration Request message to the PDSN 214a. In the present embodiment, because the A9-Setup-A8 message contains the SIP INVITE message, the PCF 212a may extract the SIP INVITE message and insert it into the A11 Registration Request message. For example, the SIP INVITE message may be inserted into a subsection 704 of a "Critical Vendor/Organization Specific Extension: Type =[26H]" section 702. It is understood that the header, contents, and location of the SIP INVITE message within the A11 Registration Request message may differ from that shown. The insertion may occur using a standard mechanism provided for inserting fields into such a message. After inserting the SIP INVITE message into the A11 Registration Request message, the PCF 212a may then send the message to the PDSN 214a in step 506.

Referring again specifically to FIG. 5, the PDSN 214a may generally process the A11 Registration Request message received from the PCF 212a to establish the connection and reply to the PCF. In the present embodiment, because the A11 Registration Request message contains the SIP INVITE message, the PDSN 214a may extract the SIP INVITE message and forward it in a conventional manner (not shown). Accordingly, after extracting the SIP INVITE message, the PDSN 214a may treat the SIP INVITE message as though it were received after the connection with the AT has been established.

After extracting the SIP INVITE message, the PDSN 214a may then process the A11 Registration Request message in a conventional manner and send a message such as an A11 Registration Reply message to the PCF 212a in step 508. It is understood that the SIP INVITE message may be forwarded at any time after being extracted by the PDSN 214a (e.g., between steps 506 and 508, or after step 508), and the A11 Registration Request message may be processed before, during, or after the forwarding occurs.

In step 510, after receiving the A11 Registration Reply message, the PCF 212a may send a message such as an A9-Setup-A8 Complete message to the AN 206a, which may then establish the connection with the AT 218 as represented by step 512. Once complete, the AT 216 and network may exchange data as represented by step 514. As described with respect to FIG. 4, the associated connection setup between the AT 220 and its network may be occurring simultaneously due to the fact that the SIP INVITE message was passed from the AT 216 through the network prior to the establishment of the connection of step 514. Accordingly, by allowing for these parallel connection establishments, the SIP negotiation to establish the VoIP call (step 408 of FIG. 4) may occur sooner. This may result in time savings in the range of seconds to hundreds of milliseconds. Furthermore, fewer system resources may be consumed if the call fails (e.g., if the AT 220 is busy) because the failure may occur sooner than with a conventional call setup process (e.g., FIG. 3).

It is understood that the message sequence 500 and the particular messages described are only one example of many possible sequences and that the functionality provided by the sequence 500 may be achieved using different sequences and/or messages.

Referring again to FIG. 2, it is understood that various modifications may be made to enable the sequence diagram of FIG. 4 to occur. For example, the AN 206*a* and PCF 212*a* may be modified to recognize and extract a message such as a SIP INVITE message from an inbound message, and may be modified to insert the extracted message into an outbound message. The PDSN 214*a* may be modified to recognize and extract a message such as a SIP INVITE message from an inbound message. Furthermore, the AT 216 may be modified to insert a message such as a SIP INVITE message into a connection request message or other message.

In some embodiments, the AT 216 may determine whether the AN 206*a* supports an inserted SIP INVITE message. If not, the AT 216 may not insert the SIP INVITE message, but may instead send the messages separately in relatively quick succession or in a conventional manner (e.g., as shown in FIG. 3). Each component may function in this way (e.g., the AN 206*a* may make a similar determination of the capabilities of the PCF 212*a* and the PCF may make a similar determination of the capabilities of the PDSN 214*a*). In other embodiments, the AT 216 and/or other components of the system 200 may simply insert the message regardless of whether the destination component will recognize it. The destination component may then simply ignore the inserted message if the component does not support it. In this embodiment, the AT 216 may send a later SIP INVITE message if a response to the inserted SIP INVITE message is not received within a particular amount of time. In other embodiments, the network may notify the AT 216 that the inserted SIP INVITE message was received.

It is understood that the use of a SIP INVITE message is for purposes of example and that the present disclosure may be applied to many different message protocols and message types.

Although only a few exemplary embodiments of this disclosure have been described in details above, those skilled in the art will readily appreciate that many modifications are possible in the exemplary embodiments without materially departing from the novel teachings and advantages of this disclosure. Also, features illustrated and discussed above with respect to some embodiments can be combined with features illustrated and discussed above with respect to other embodiments. For example, various steps from different flow charts and/or sequence diagrams may be combined, performed in an order different from the order shown, or further separated into additional steps. Furthermore, steps may be performed by network elements other than those disclosed. Accordingly, all such modifications are intended to be included within the scope of this disclosure.

What is claimed is:

1. A method for setting up a packet data session in a wireless network comprising:
   receiving a packet data channel request message and an invitation message at a first node over an air interface from a mobile device, wherein the invitation message is directed to a terminating device;
   inserting the invitation message into a setup message used to set up the packet data channel;
   sending the setup message to a second node;
   extracting the invitation message from the setup message by the second node;
   forwarding the invitation message to a third node; and
   processing the setup message to establish the packet data channel.

2. The method of claim 1 further comprising extracting the invitation message from the packet data channel request message received from the mobile device.

3. The method of claim 1 wherein the invitation message is inserted into the setup message using a predefined insertion mechanism.

4. The method of claim 1 further comprising ignoring, by the second node, the invitation message if the second node is not configured to extract the invitation message.

5. The method of claim 4 further comprising sending another invitation message by the mobile device if no response is received to the invitation message inserted into the setup message.

6. The method of claim 1 further comprising determining whether the second node is configured to extract the invitation message from the setup message, wherein the inserting the invitation message into the setup message does not occur if the second node is not configured to extract the invitation message.

7. The method of claim 1 further comprising initiating the establishment a packet data channel between the terminating device and an access network coupled to the terminating device in response to the invitation message.

8. The method of claim 7 wherein the initiating the establishment of the packet data channel for the terminating device begins before the packet data channel for the mobile device is established.

9. A method for setting up a packet data session in a wireless network comprising:
   receiving a packet data channel request and an invitation message for a terminating device over a wireless air interface from a mobile device;
   inserting the invitation message into a setup request message;
   sending the setup request message to a packet control function node;
   extracting the invitation message from the setup request message;
   inserting the invitation message into a registration request message;
   sending the registration request message to a packet data serving node;
   extracting the invitation message from the registration request message;
   forwarding the invitation message to the terminating device, wherein the invitation message is forwarded while the packet data channel is being established with the mobile device.

10. The method of claim 9 wherein the invitation message is a session initiation protocol (SIP) INVITE message.

11. The method of claim 10 wherein the invitation message is forwarded by the packet data serving node to a SIP server.

12. The method of claim 9 wherein the setup message is an A9-Setup-A8 message.

13. The method of claim 9 wherein the registration request message is an A11 Registration Request message.

14. The method of claim 9 wherein the invitation message is forwarded to the terminating device prior to responding, by the packet data serving node, to the registration request message.

15. A system comprising:
   an access network;
   a core network coupled to the access network, wherein the core network includes at least one packet switching node; and
   a plurality of executable instructions including instructions for:
      receiving a packet data channel request message and an invitation message by the access network over an air interface from an originating access terminal, wherein the invitation message is directed to a terminating access terminal;
      inserting the invitation message into a setup message used to set up the packet data channel and sending the setup message to the core network;
      extracting the invitation message from the setup message by the packet switching node;
      forwarding the invitation message to establish a connection with the terminating access terminal; and
      processing the setup message to establish the packet data channel.

16. The system of claim 15 wherein the invitation message is inserted into the setup message using a predefined insertion mechanism.

17. The method of claim 15 further comprising ignoring, by the access network, the invitation message if the access network is not configured to extract the invitation message.

18. The method of claim 15 further comprising ignoring, by the core network, the invitation message if the core network is not configured to extract the invitation message.

19. A node in a communications network comprising:
   a first interface configured for receiving an inbound message for establishing a packet data session;
   a second interface configured for sending an outbound message for establishing the packet data session in response to receiving the inbound message; and
   a plurality of executable instructions including instructions for:
      extracting an invitation message from the inbound message, wherein the invitation message is not needed for establishing the packet data session; and
      inserting the extracted invitation message into the outbound message for communication to another node in the communications network.

20. The node of claim 19 wherein the invitation message is a Session Initiation Protocol (SIP) INVITE message.

21. The node of claim 19 wherein the node is in an access network.

22. The node of claim 21 wherein the inbound message is a connection request message from an access terminal.

23. The node of claim 19 wherein the node is in a core network.

24. The node of claim 23 wherein the node is a packet control function.

25. The node of claim 24 wherein the inbound message is an A9-Setup-A8 message.

* * * * *

UNITED STATES PATENT AND TRADEMARK OFFICE
CERTIFICATE OF CORRECTION

| | |
|---|---|
| PATENT NO. | : 7,558,241 B2 |
| APPLICATION NO. | : 11/485771 |
| DATED | : July 7, 2009 |
| INVENTOR(S) | : William J. Semper |

Page 1 of 1

It is certified that error appears in the above-identified patent and that said Letters Patent is hereby corrected as shown below:

Column 8, claim 13, line 63, delete "A11" and replace with --All--.

Signed and Sealed this

Twenty-seventh Day of April, 2010

David J. Kappos
*Director of the United States Patent and Trademark Office*